(12) United States Patent
Watanabe

(10) Patent No.: US 6,426,925 B1
(45) Date of Patent: Jul. 30, 2002

(54) RECORDING AND/OR REPRODUCING APPARATUS WITH TILT ADJUSTMENT MECHANISM

(75) Inventor: Hiromu Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/555,441

(22) PCT Filed: Oct. 8, 1999

(86) PCT No.: PCT/JP99/05586

§ 371 (c)(1),
(2), (4) Date: Jul. 11, 2000

(87) PCT Pub. No.: WO00/22616

PCT Pub. Date: Apr. 20, 2000

(30) Foreign Application Priority Data

Oct. 9, 1998 (JP) .......................................... 10-288563

(51) Int. Cl.⁷ ............................................. G11B 7/095
(52) U.S. Cl. .................................. 369/44.32; 369/53.19
(58) Field of Search .......................... 369/44.14–44.22, 369/219, 233, 244, 44.32, 53.19

(56) References Cited

U.S. PATENT DOCUMENTS

| | | | | |
|---|---|---|---|---|
| 4,694,442 A | * | 9/1987 | Gijzen et al. | 369/44.32 |
| 5,081,618 A | * | 1/1992 | Abe | 369/195 |
| 5,303,215 A | * | 4/1994 | Dewar et al. | 369/111 |
| 5,307,339 A | * | 4/1994 | Tanaka | 369/215 |
| 5,311,497 A | * | 5/1994 | Takizawa et al. | 369/195 |
| 5,612,935 A | * | 3/1997 | Ishimatsu | 369/44.14 |
| 5,657,303 A | * | 8/1997 | Namoto et al. | 369/100 |
| 5,881,034 A | * | 3/1999 | Mano et al. | 369/44.14 |
| 5,886,962 A | * | 3/1999 | Takamine et al. | 369/44.32 |
| 5,970,035 A | * | 10/1999 | Ohmori et al. | 369/44.27 |
| 6,111,827 A | * | 8/2000 | Miike | 369/44.14 |
| 6,175,544 B1 | * | 1/2001 | Shiomi | 369/219 |
| 6,282,161 B1 | * | 8/2001 | Son et al. | 369/44.27 |
| 6,324,152 B1 | * | 11/2001 | Eguchi et al. | 369/258 |

FOREIGN PATENT DOCUMENTS

| | | | |
|---|---|---|---|
| EP | 0 196 691 A1 | 10/1986 | G11B/19/20 |
| JP | 60-118982 | 8/1985 | G04B/19/28 |
| JP | 61-210531 | 9/1986 | G11B/7/09 |
| JP | 62-29634 | 2/1987 | G11B/7/09 |
| JP | 63-94865 | 6/1988 | B62D/1/04 |
| JP | 2-16420 | 2/1990 | G11B/7/09 |
| JP | 09120565 | * 5/1997 | |
| JP | 9-180229 | 7/1997 | G11B/7/095 |

* cited by examiner

Primary Examiner—Brian E. Miller
(74) Attorney, Agent, or Firm—Oblon, Spivak, McClelland, Maier & Neustadt, P.C.

(57) ABSTRACT

The present invention relates to a recording and/or reproducing apparatus that records or reproduces information signals by scanning a signal recording surface of a rotated disk using a light beam irradiated from an optical pickup. Further, the present invention provides a skew adjustment based on a detection result from a detection unit detecting a return light beam that is irradiated onto the disk and is reflected thereon. The present invention comprises a disk rotating drive mechanism; a transfer mechanism that moves this rotating drive mechanism in a diametric direction of a mounted disk; an optical pickup unit that uses an objective lens to converge a light beam on a recording surface of a disk; a detection unit that irradiates a light beam onto the disk mounted on the rotating drive mechanism and detects a tilt of the disk mounted on the rotating drive mechanism based on the light beam returned from the disk; and an adjustment mechanism that provides a rotative movement based on a detection result from this detection unit around a center-axis line orthogonal to a line formed between an optical axis of the objective lens and the center of the disk.

12 Claims, 3 Drawing Sheets

RECORDING AND/OR REPRODUCING APPARATUS WITH TILT ADJUSTMENT MECHANISM

TECHNICAL FIELD

The present invention relates to a recording and/or reproducing apparatus including an optical pickup in which an objective lens is arranged to converge and irradiate light beams onto a signal recording surface of an optical disk rotated by a rotating drive mechanism, and an optical pickup apparatus for such a recording and/or reproducing apparatus. More particularly, the present invention relates to a recording and/or reproducing apparatus having an adjustment mechanism for adjusting a tilted optical axis of an objective lens against an optical disk, and an optical pickup apparatus therefore.

BACKGROUND ART

In a conventional optical disk intended to be used as a recording medium for information signals, it has been proposed to increase a recording density in the optical disk so as to have a large recording capacity. An optical disk for a high recording density is designed to have a narrow track width and a small pitch between tracks, each of which information signals record.

To accurately read information signals recorded in the high-density optical disk, it is necessary to scan a recording track having a narrow track width and a small track pitch by accurately converging a light beam onto that track. Accurately converging light beams onto such a recording track requires an objective lens with a large numerical aperture (NA).

An objective lens with a large numerical aperture (NA) has a short focal length. Such an objective lens generates a small beam spot to be converged on a recording track of the optical disk. An optical disk is mounted on the disk rotating drive mechanism and is rotated thereby. If the optical disk is bent and is deflected, the disk causes a skew that prevents a light beam from being irradiated perpendicularly onto the optical disk. Such a skew also prevents a light beam from being applied accurately to a specified recording track on the optical disk, thus disabling information signals from being read accurately.

The objective lens converges and irradiates light beams onto the signal recording surface of the optical disk. A light beam irradiated onto the optical disk must be applied accurately and perpendicularly to the optical disk without a skew. For this purpose, there has been proposed an optical pickup apparatus provided with a skew adjustment mechanism for adjusting a tilt of the objective lens in accordance with a tilt of the optical disk rotated by the rotating drive mechanism.

With a recording and/or reproducing apparatus that uses optical disks as recording media, a rotating drive mechanism is unmovably arranged for rotating an optical disk, and an optical pickup apparatus is moved along a diameter of the rotating optical disk across inner and outer peripheries thereon. Thereby, the recording or reproducing of information signals is performed by scanning recording tracks on the optical disk with optical beams. Recording and/or reproducing apparatus of this type is constructed to provide a skew adjustment by tilting the entire optical pickup apparatus including an optical pickup transfer mechanism.

In order to tilt the optical pickup apparatus including the transfer mechanism, a tilt-adjustable support member is provided on a base on which the disk rotating drive mechanism and the like are mounted. This support member supports the optical pickup apparatus in a movable fashion and carries the transfer mechanism. Since the support member is movable on the base, a skew adjustment is made by adjusting a tilt of the optical pickup apparatus.

As mentioned above, the skew adjustment mechanism adjusts a skew by accordingly tilting the support member that supports the optical pickup apparatus in a movable fashion. In the skew adjustment mechanism of this type, the optical pickup apparatus moves on the support member, and thus a supporting point for the tilt varies with the optical pickup apparatus. When the support member is tilted, a displacement amount of the optical pickup apparatus varies with a moved position. Especially when the optical pickup apparatus moves to a position that is far from the supporting point for tilting the support member, just a slight tilt of the support member greatly displaces the optical pickup apparatus. The objective lens irradiating a light beam onto the optical disk moves remarkably, causing a tracking error that disables a light beam from scanning a specified recording track. When a tracking error occurs, the optical pickup apparatus is incapable of accurate tracking and cannot correctly read information signals from the optical disk.

DISCLOSURE OF THE INVENTION

It is an object of the present invention to provide a new recording and/or reproducing apparatus and a new optical pickup apparatus therefore that solve problems found in conventional recording and/or reproducing apparatuses and optical pickup apparatuses.

It is another object of the present invention to provide a recording and/or reproducing apparatus and an optical pickup apparatus therefore that can accurately adjust a skew of light beams irradiated onto an optical disk mounted and rotated on a rotating drive mechanism, and accurately read or write information signals from or to the optical disk.

It is still another object of the present invention to provide a recording and/or reproducing apparatus and an optical pickup apparatus therefore that can accurately read or write information signals to a high-density optical disk.

In order to attain the above-mentioned objects, a recording and/or reproducing apparatus according to the present invention comprises: a rotating drive mechanism provided to mount and rotate a disk with at least one signal recording surface; a transfer mechanism for transferring the rotating drive mechanism along a diameter of the mounted disk; an optical pickup having at least one objective lens to converge a light beam on the recording disk surface; a detection unit provided to irradiate a light beam onto the disk mounted on the rotating drive mechanism and detect a tilt of the disk mounted on said rotating drive mechanism based on the light beam returned from the disk; and an adjustment mechanism for providing a rotative movement based on a detection result from the detection unit around a center-axis line orthogonal to a line formed between an optical axis of the objective lens and the center of the disk mounted on the rotating drive mechanism.

This recording and/or reproducing apparatus performs a skew adjustment by adjusting a tilt of the objective lens against the signal recording surface of the optical disk based on a detection result from the detection unit that detects a return light beam that is irradiated onto the disk and is reflected thereon.

The recording and/or reproducing apparatus according to the present invention is so configured that a distance from the objective lens to a center axis orthogonal to a line formed between an optical axis of the objective lens and the center of the disk mounted on the rotating drive mechanism becomes shorter than a distance from the center axis to a point of action for the optical pickup driven by the adjustment mechanism.

The adjustment mechanism is provided with a cam and a motor. The cam rotates the optical pickup around the center axis orthogonal to a line formed between an optical axis of the objective lens and the center of the disk mounted on the rotating drive mechanism. The motor drives the cam based on a detection result from the detection unit that detects a return light beam that is irradiated onto the disk and is reflected thereon.

Further, the recording and/or reproducing apparatus according to the present invention comprises: a rotating drive mechanism that mounts and rotates a disk with at least one signal recording surface an optical pickup having at least one objective lens to converge a light beam on the recording disk surface; a detection unit provided to irradiate a light beam onto the disk mounted on the rotating drive mechanism and detect a tilt of the disk mounted on the rotating drive mechanism based on the light beam returned from the disk; and an adjustment mechanism for providing a rotative movement based on a detection result from the detection unit around a center-axis line orthogonal to a line formed between an optical axis of the objective lens and the center of the disk mounted on the rotating drive mechanism, where in a distance from said center axis to the objective lens becomes shorter than a distance from said center axis to a point of action for the optical pickup of the adjustment mechanism.

Furthermore, the optical pickup apparatus according to the present invention comprises: an optical pickup unit having to converge a light beam from a light source on the recording surface of a disk with at least one signal recording surface; a detection unit provided to irradiate a light beam onto the disk mounted on the rotating drive mechanism and detect a tilt of the disk based on the light beam returned from the disk where said optical pickup irradiates a light beam; and an adjustment mechanism for providing a rotative movement based on a detection result from the detection unit around a center-axis line orthogonal to a line formed between an optical axis of the objective lens and the center of the disk where said optical pickup irradiates a light beam.

Still further, the optical pickup apparatus according to the present invention comprises: an optical pickup having at least one objective lens; a detection unit for detecting a tilt of a disk having at least one signal recording surface; and an adjustment mechanism for providing a rotative movement based on a detection result from the detection unit around a center-axis line orthogonal to an optical axis of the objective lens, wherein a distance from said center axis to the objective lens becomes shorter than a distance from said center axis to a point of action for the optical pickup driven by the adjustment mechanism.

Other objects and advantages of the present invention will become apparent from the detailed description to follow taken in conjunction with the appended embodiment.

BEST MODE FOR CARRYING OUT THE INVENTION

The following describes the optical pickup apparatus according to the present invention and the disk reproducing apparatus using this optical pickup apparatus with reference to the accompanying drawings.

Figure 1:
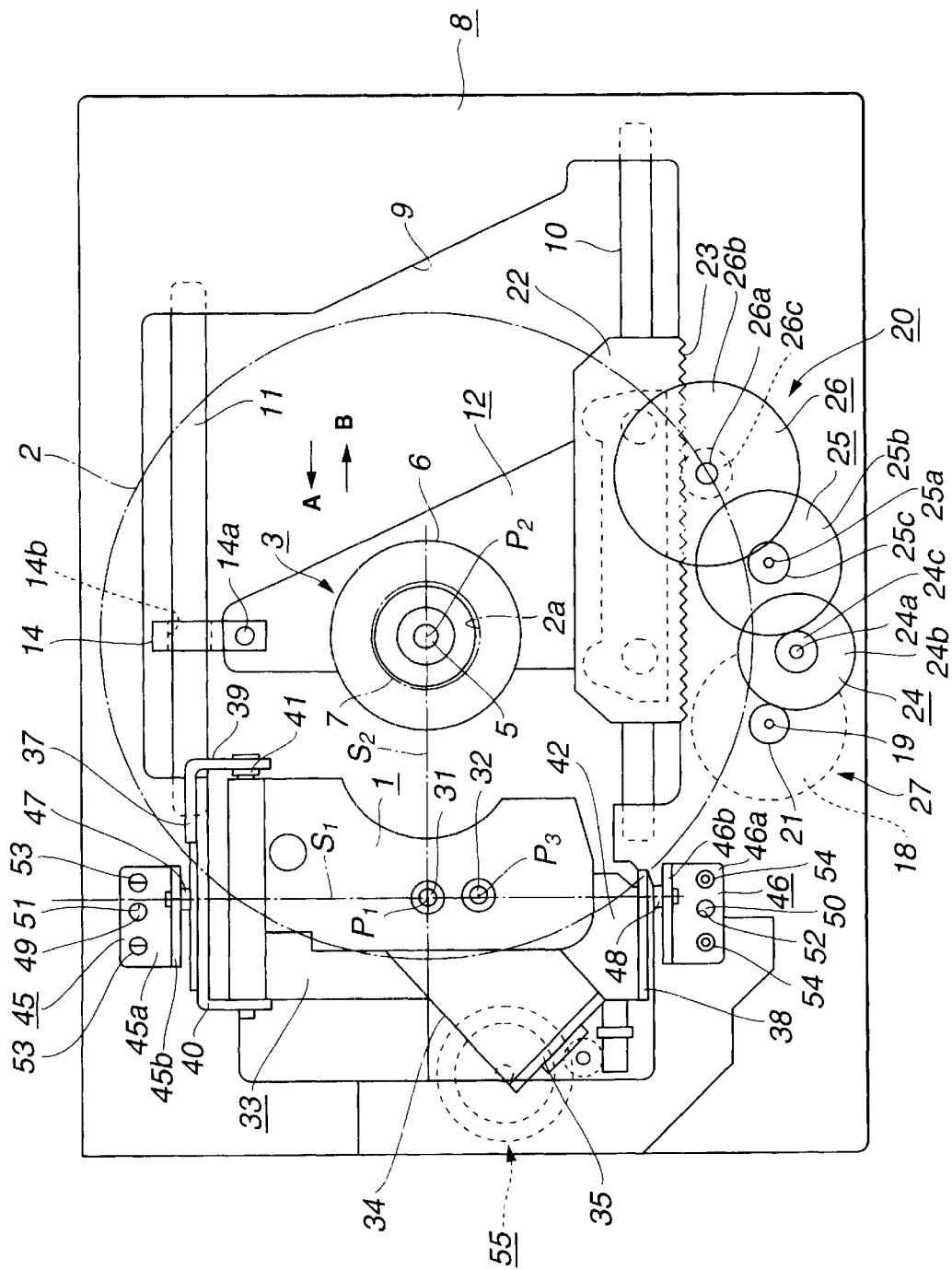
FIG. 1 is a top view showing the optical pickup apparatus according to the present invention and the optical disk reproducing apparatus using this optical pickup.
Figure 2:
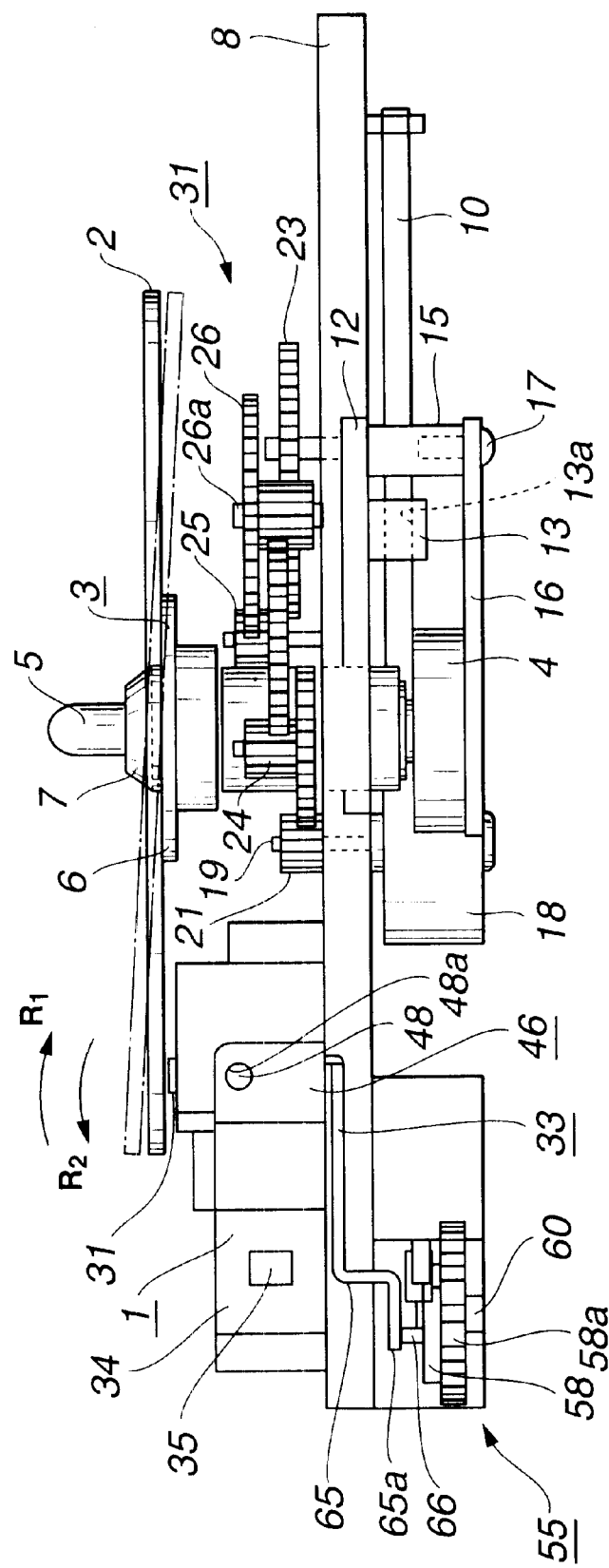
FIG. 2 is a side view of the optical disk reproducing apparatus ready for a skew adjustment.

As shown in FIGS. 1 and 2, on an optical pickup apparatus 1 according to the present invention and an optical disk reproducing apparatus using this optical pickup apparatus 1 is mounted an optical disk. A rotating drive mechanism 3 is provided to rotate the optical disk 2. As shown in FIG. 2, the rotating drive mechanism 3 is provided with a spindle motor 4 having a rotation axis 5 and a disk table 6. The disk table 6 is installed at the tip side of the rotation axis 5 of the spindle motor 4 so that the disk table rotates in conjunction with the rotation axis 5. A centering member 7 is attached along the rotation axis 5 in an axially movable fashion at the center of the upper side of the disk table 6 where the optical disk 2 is mounted. The centering member 7 matches the rotation center of the optical disk 2 with the center of the disk table 6 by engaging with a center hole 2a of the optical disk 2. The centering member 7 is pressed toward the tip of the rotation axis 5 by means of a coil spring. The optical disk 2 is mounted on the disk table 6 by engaging the center hole 2a with the centering member 7. The optical disk 2 is locked between the disk table 6 and a clamp (not shown) pressed against the disk table 6 and is rotated together with the disk table 6.

The apparatus comprises a base 8 on which an opening 9 is provided. At the both ends of the opening 9, a first and second guide shafts 10 and 11 are arranged in parallel with each other. The rotating drive mechanism 3 is installed on a transfer base 12 which is supported on the first and second guide shafts 10 and 11 in a movable fashion. Namely, as shown in FIG. 2, the rotating drive mechanism 3 is installed on the transfer base 12 so that the rotation axis 5 projects from a topside of the transfer base 12, whereby a stator substrate 16 of the spindle motor 4 is fixed with a fixing screw 17 to the tip of a connecting member 15 vertically attached to an underside of the transfer base 12.

As shown in FIG. 2, the transfer base 12 where the rotating drive mechanism 3 is mounted is supported between the first and second guide shafts 10 and 11. Thereby, a support 13 on one end of the transfer base 12 is provided with a transfer guide hole 13a where the first guide shaft 10 is inserted. As shown in FIG. 1, a hold-down member 14a is used to connect the other end of the transfer base 12 to a guide block 14 where the second guide shaft 11 is inserted in a movable fashion. As shown in FIG. 1, the transfer base 12 moves in directions of arrows A and B in FIG. 1 along the first and second guide shafts 10 and 11 by means of a feed mechanism 20 having a feed motor 18 mounted on an underside of the base 8.

The guide shaft 11 on the guide block 14 is inserted into an insert hole 14b, wherein a bearing is provided to ensure a smooth movement of the transfer base 13. As shown in FIG. 2, the feed motor 18 composing the feed mechanism 20 is mounted on an underside of the base 8 with the drive axis 19 protruded on a topside of the base 8. As shown in FIG. 1, the feed motor 18 is connected to the transfer base 12 in such a way that the coupled gear mechanism 27 connects between a drive gear 21 mounted on the drive axis 19 of the feed motor 18 and a rack gear 23 that parallels the first guide shaft 10 and is formed on one side of a rack plate 22 mounted on one end of the transfer base 12. The coupled gear mechanism 27 consists of a first, second, and third coupled gears 24, 25, and 26 that engage with each other and pivot on support shafts 24a, 25a, and 26a, respectively, planted on a topside of the base 8. The coupled gear mechanism 27 connects between the drive gear 21 and the rack gear 23 in such a way that a large gear 24b of the first coupled gear 24 engages with the drive gear 21; a small gear 24c coaxially fitted to the large gear 24b engages with a large gear 25b of the second coupled gear 25; a small gear 25c coaxially fitted to the large gear 25b engages with a large gear 26b of the third coupled gear 26; and a small gear 26c coaxially fitted to the large gear 26b engages with the rack gear 23.

The optical pickup apparatus 1 scans the signal recording surface of the optical disk 2 rotated by said rotating drive mechanism 3 and reads an information signal from the optical disk 2. As shown in FIGS. 1 and 2, the optical pickup apparatus 1 is mounted on one end of the base 8 against a transfer direction of the rotating drive mechanism 3 that is mounted on the transfer base 12 and moves with the transfer base 12. The optical pickup apparatus 1 is provided with the first objective lens 31 with a large numerical aperture (NA) and the second objective lens 32. The first objective lens 31 is used for reproducing the optical disk 2 whose substrate is thinner than 1.2 mm for providing high recording density and capacity. The second objective lens 32 is used for reproducing an optical disk whose substrate is approximately 1.2 mm like a compact disk for a recording density lower than said high-capacity optical disk 2. The numerical aperture (NA) for the second objective lens 32 is smaller than that for the first objective lens 32.

Though detailed descriptions are omitted, each of the first and second objective lenses 31 and 32 is supported by an actuator that displaces each lens in the direction of two axes. A flat surface direction, namely a tracking direction is orthogonal to the direction of these two axes. A direction parallel to optical axes of these objective lenses 31 and 32, namely a focus direction or an optical axis direction is orthogonal to the tracking direction. The first and second objective lenses 31 and 32 are supported on an optical block 34 that is mounted on a support base 33 via the actuators.

The use of the first objective lens 31 or the second objective lens 32 depends on an optical disk type. The optical disk type is determined by identification data read from a discrimination unit (not shown) on this disk reproducing apparatus or the optical disk 2 mounted on the disk reproducing apparatus.

Either the first objective lens 31 or the second objective lens 32 is selected according to the type of an optical disk mounted on the disk reproducing apparatus and is displaced in the focus or tracking direction by the actuator that is supplied with a drive current according to a focus control signal and a tracking control signal. These control signals are generated from a focus error signal and a tracking error signal. These error signals are generated according to a detection signal. To generate this detection signal, an optical detection unit (not shown) detects a return light beam that is irradiated from a light source (to be described) composing the optical pickup apparatus 1 and is reflected on the optical disk 2 rotated by the rotating drive mechanism 3.

Figure 3:
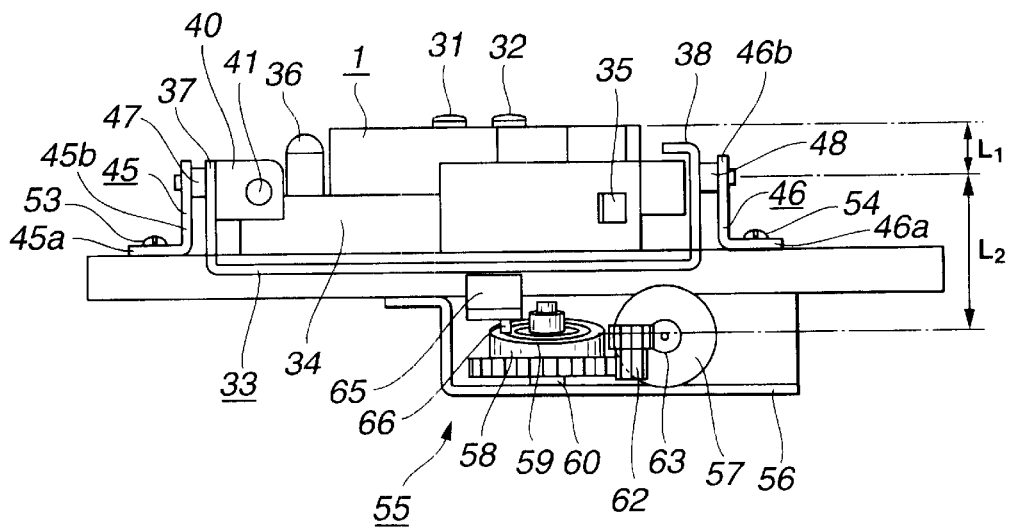
FIG. 3 is a front view of the optical disk reproducing apparatus shown in FIG. 1.

As mentioned above, on the optical block 34 the first and second objective lenses 31 and 32 are mounted by means of actuators. As shown in FIGS. 2 and 3, the optical block 34 is also provided with optical parts such as a light source 35 that irradiates a light beam via the first objective lens 31 or the second objective lens 32 onto the optical disk 2 mounted on the disk table 6 of the rotating drive mechanism 3; a photodetector, a disk, or the like that detects a return light beam reflected on the optical disk 2; and a beam splitter or the like that leads a light beam from the light source 35 to the first or second objective lens 31 or 32 and leads a return light beam reflected on the optical disk 2 to the photodetector.

The light source 35 is provided with a semiconductor laser that generates a short-wave light beam used for reproducing the high-density optical disk 2 and is provided with a semiconductor laser that generates a light beam used for reproducing the low-density optical disk 2 such as a compact disk.

As shown in FIG. 3, a skew sensor 36 is provided on one end of the optical block 34 to detect a tilt of a light beam irradiated onto the optical disk 2 against the optical disk 2 mounted on the disk table 6 of the rotating drive mechanism 3. The skew sensor 36 is provided with a light emitting device that irradiates a light beam onto the signal recording surface of the optical disk 2 mounted on the disk table 6, and is provided with a light receiving element that receives a return light beam reflected on the optical disk 2. The skew sensor 36 uses the light receiving element to detect the return light beam, thus detecting a tilt of the light beam against the signal recording surface of the optical disk 2. The skew sensor 36 detects a tilt of the light beam against the signal recording surface of the optical disk 2 by detecting a spot shape of the return light beam that is reflected on the optical disk 2 and enters the light receiving element.

The support base 33 is provided with the optical block 34 that supports the first and second objective lenses 31 and 32. As shown in FIG. 3, a first and second raised edges 37 and 38 are oppositely provided on both sides of the support base 33 in a direction along which the first and second objective lenses 31 and 32 are paralleled. A pair of turned edges 39 and 40 is formed on both sides of the first raised edge 37. As shown in FIG. 1, the optical block 34 is mounted on the support base 33 in such a way that one side of the optical block 34 where the skew sensor 36 is provided is provided with a support shaft 41 between a pair of turned edges 39 and 40 and the other side of the optical block 34 is fixed with a fixing screw (not shown).

The first and second raised edges 37 and 38 are mounted on the support base 33. As shown in FIGS. 2 and 3, a first and second support shafts 47 and 48 are attached to outsides of the raised edges 37 and 38, respectively. A first and second support members 45 and 46 mount the support base 33 on a topside of the base 8. The support members 45 and 46 support the support shafts 47 and 48 respectively in a rotatable fashion. The first and second support shafts 47 and 48 are installed so that they center on a line Si that orthogonally passes an optical axis $P_1$ of the first objective lens 31 supported by the optical block 34 mounted on the support base 33.

As shown in FIG. 3, the first and second support members 45 and 46 supporting the support base 33 in a rotatable fashion consist of mount edges 45a and 46a on the support base 33 and support edges 45b and 46b bent vertically to the mount edges 45a and 46a. Each of the first and second support members 45 and 46 forms an L shape as a whole. As shown in FIG. 1, the first and second support members 45 and 46 are mounted on the base 8 in such a way that positioning projections 49 and 50 on a topside of the base 8 fit in positioning holes 51 and 52 in the mount edges 45a and 46a, and the mount edges 45a and 46a are fixed with fixing screws 53 and 54. The first and second support members 45 and 46 are mounted on the base 8 so that support edges 45b and 46b will be parallel to the first and second guide shafts 10 and 11.

The support base 33 is supported rotatably in directions of arrows $R_1$ and $R_2$ in FIG. 2 in such a way that the first and second support shafts 47 and 48 are fit in a support hole 48a in the support edges 45b and 46b of the first and second support members 45 and 46. Then, the support base 33 is rotatably centered on the first and second support shafts 47 and 48 without looseness by means of a torsion coil spring (not shown) that is wound around, say, the first and second support shafts 47 and 48 and is placed between the support base 33 and the first and second support members 45 and 46.

The first and second support members 45 and 46 support the support base 33 so that the optical axis $P_1$ of the first objective lens 31 can be positioned to the line $S_2$ formed between the optical axis $P_1$ of the first objective lens 31 and a rotation center $P_2$ of the disk table 6. The first objective lens 31 is used for reproducing the optical disk 2 that permits high-density recording of information signals. The first objective lens 31 is arranged so that the optical axis $P_1$ thereof is positioned to the line $S_2$ formed between the optical axis $P_1$ of the first objective lens 31 and the rotation center $P_2$ of the disk table 6. Accordingly, a light beam irradiated from the first objective lens 31 can accurately scan recording tracks on the optical disk 2 along a center line passing the rotation center of the optical disk 2. This time, the optical disk 2 is mounted on the disk table 6 of the rotating drive mechanism 3 transferred by the feed mechanism 20. Since the light beam moves along the center line passing the rotation center of the optical disk 2, the light beam can track a recording track across inner and outer peripheries on the optical disk 2 accurately orthogonalized to the recording track that is formed concentrically or spirally on the signal recording surface of the optical disk 2. Consequently, a light beam converged by the first objective lens 31 can accurately form a beam spot on a specified recording track to track it, allowing accurate tracking and reading of information from recording tracks formed with a narrow track width and a small track pitch for high-density recording.

As shown in FIG. 1, the second objective lens 32 used for reproducing the optical disk 2 such as a compact disk is arranged in the vicinity of the first objective lens 31. Since the first objective lens 31 is positioned to the line $S_2$ formed between the optical axis $P_1$ of the first objective lens 31 and the rotation center $P_2$ of the disk table 6, an optical axis $P_3$ moves across inner and outer peripheries on the optical disk 2 at an offset position from a center line passing the rotation center of the optical disk 2. The optical disk 2 such as a compact disk uses a wider track width and a larger track pitch than those of said high-density optical disk 2. Even if the light beam is less accurately orthogonalized to the recording track and tracks it with a slight offset state, the second objective lens 32 converges a light beam to form a beam spot on a specified recording track, allowing reproduction of information signals recorded on the recording track with a sufficiently reproductive output.

The support base 33 is rotatably supported with the first and second support shafts 47 and 48 in the first and second support members 45 and 46 mounted on the base 8. An adjustment mechanism 55 rotatively moves the support base 33 in directions of arrows $R_1$ and $R_2$ in FIG. 2 around the first and second support shafts 47 and 48 as a center axis. As shown FIGS. 3 and 4, the adjustment mechanism 55 is provided with a drive motor 57 mounted on a drive mechanism mounting plate 56 mounted on an underside of the base 8 and with a cam gear 58 rotated by the drive motor 57. The cam gear 58 is provided with a slantly cut cam face 59. The cam gear 58 is rotatably supported with a support shaft 60 planted on the drive mechanism mounting plate 56.

The drive motor 57 is coupled to the cam gear 58 by means of a coupling gear 62 that is rotatably supported by the support shaft 60 planted on the drive mechanism mounting plate 56. The coupling gear 62 consists of a bevel gear 62a formed at its tip and a spur gear 62b coaxially formed on its side. The coupling gear 62 couples the drive motor 57 to the cain gear 58 in such a way that the bevel gear 62a engages with a worm gear 63 fitted to a drive shaft 57a of the drive motor 57 and the spur gear 62b engages with a gear 58a formed on a bottom periphery of the cam gear 58.

Figure 4:
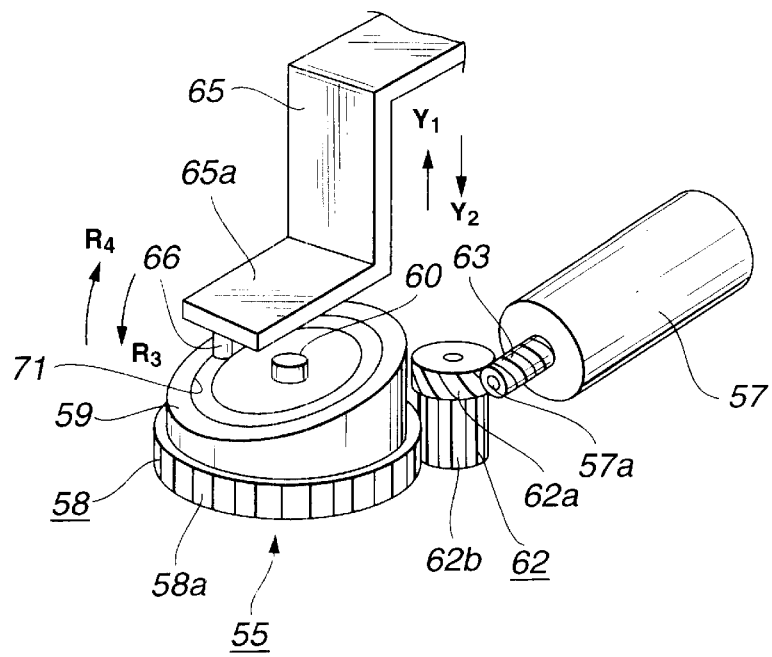
FIG. 4 is a perspective view showing major components of the adjustment mechanism that rotatively moves the optical pickup apparatus.

A cam groove 71 on the cam face 59 of the cam gear 58 holds a projection 66 at the tip of an arm 65 extended from the underside of the base 8. The arm 65 is formed so that it extends from the underside of the base 8 and toward a direction away from the first and second support shafts 47 and 48 that allow the first and second support members 45 and 46 to support the support base 33. As shown in FIGS. 2 and 4, the tip of the arm 65 is provided with a bent edge 65a against the cam face 59 of the cam gear 58. The bent edge 65a is provided with the projection 66 that fits in the cam groove 71 on the cam face 59. Thereby, the bent edge 65a is so formed that it presses the projection 66 against the cam face 59 with a specified pressure to prevent the projection 66 from being detached from the cam face 59.

The adjustment mechanism 55 so configured as mentioned above is driven when a surface deflection occurs due to a warp or the like of the optical disk 2 rotated on the disk table 6 of the rotating drive mechanism 3 and the skew sensor 36 detects a tilt in the light beam irradiated onto the optical disk 2. When the skew sensor 36 detects a tilt of the optical disk 2, a detection output drives the drive motor 57 of the adjustment mechanism 55 and the cam gear 58 rotates in the arrow direction $R_3$ or $R_4$ in FIG. 4 via the coupling gear 62. When the cam gear 58 rotates, the arm 65 whose projection 66 is pressed against the cam face 59 moves vertically in an arrow direction $Y_1$ or $Y_2$ in FIG. 4 in accordance with the cam face 59. When the arm 65 moves vertically, the support base 33 moves rotatively in the arrow direction $R_1$ or $R_2$ in FIG. 2 around the first and second support shafts 47 and 48, adjusting an angle of the first and second objective lenses 31 and 32 against the optical disk 2. Thereby, the first and second objective lenses 31 and 32 are supported on the optical block 34 mounted on the support base 33. The adjustment mechanism 55 adjusts an angle of the first and second objective lenses 31 and 32 to provide a constant range of jitter components with reference to the lowest level of jitter components in an output detected by the photodetector of the optical pickup apparatus 1 from information signals recorded on the optical disk 2.

As shown in FIG. 3, said optical pickup apparatus 1 allows a distance $L_1$ from the first and second support shafts 47 and 48 to the center of the first objective lens 31 to be shorter than a distance $L_2$ from the first and second support shafts 47 and 48 to a contact point between the cam face 59 of the cam gear 58 and the projection 66 at the arm 65 that works as a point of action for rotatively moving the support base 33. Thereby, the first and second support shafts 47 and 48 are provided at the side of the support base 33 that supports the first and second objective lenses 31 and 32 and optical block 34. Said contact point is positioned below the base 33. Since the optical pickup apparatus 1 provides the short distance Li from the first and second support shafts 47 and 48 to the center of the first objective lens 31, a skew adjustment by rotatively moving the support base 33 causes an amount of movement at the side of the first and second objective lenses 31 and 32 smaller than an amount of movement at the side of the arm 65. The optical pickup apparatus 1 permits a skew adjustment by keeping an amount of movement by the first and second objective lenses 31 and 32 smaller than an amount of movement by the entire support base 33, providing an easy, high-precision skew adjustment.

The optical pickup apparatus 1 according to the present invention provides a skew adjustment by rotatively moving the support base 33 around the first and second support shafts 47 and 48 mounted on the support base 33 supporting the first and second objective lenses 31 and 32 and optical block 34, causing no change in a rotative supporting point for the first and second objective lenses 31 and 32. Accordingly, the first and second objective lenses 31 and 32 can accurately adjust a skew in accordance with a detection output from the skew sensor 36. Additionally, the distance $L_1$ from the first and second support shafts 47 and 48 to the center of the first objective lens 31 is shorter than the distance $L_2$ from the first and second support shafts 47 and 48 to the contact point, providing a fine, secure skew adjustment.

Especially, a skew adjustment is provided by rotatively moving the support base 33 around the line $S_1$ orthogonal to the line $S_2$ formed between the optical axis $P_1$ of the first objective lens 31 used for reproducing the high-density optical disk 2 and the rotation center $P_2$ of the disk table 6. Accordingly, an accurate skew adjustment is available for the optical disk 2 with a narrow track width and a small track pitch for high density recording.

The optical pickup apparatus 1 according to the present invention and a disk reproducing apparatus using this optical pickup apparatus can provide a skew adjustment by rotatively moving just the support base 33 that supports the first and second objective lenses 31 and 32 and optical block 34, easily providing an accurate skew adjustment.

Said disk reproducing apparatus places the rotating drive mechanism 3 of the optical disk 2 in an immovable fashion and the optical pickup apparatus 1 in a movable fashion. It is also possible to arrange the rotating drive mechanism 3 and the optical pickup apparatus 1 in a movable fashion relatively to a diametric direction of the optical disk 2 mounted on the rotating drive mechanism 3. Also in this case, it is possible to easily provide an accurate skew adjustment by rotatively moving just the support base 33 that supports the first and second objective lenses 31 and 32 and optical block 34 for skew adjustment.

Said optical pickup apparatus 1 uses two objective lenses 31 and 32 for use with a disk recording and/or reproducing apparatus that permits the use of both the optical disk 2 for high recording density and capacity and the optical disk 2 such as a compact disk. Said optical pickup apparatus 1 as is can be also applied to a disk recording and/or reproducing apparatus that uses a single objective lens.

Said example describes the optical pickup apparatus 1 when it is applied to a disk reproducing apparatus. It is also appreciated that the present invention may be applied to a disk recording and/or reproducing apparatus using an optical disk that permits information signal recording.

Industrial Applicability

The optical pickup apparatus according to the present invention and the disk recording and/or reproducing apparatus using this optical pickup apparatus can provide a skew adjustment by rotatively moving just the support base that supports the objective lenses, easily providing an accurate skew adjustment. Especially, it is possible to provide an accurate, easy skew adjustment by rotatively moving the support base supporting the objective lenses around the line orthogonal to the line formed between the optical axis of the objective lens and the center of the disk mounted on the rotating drive mechanism.

What is claimed is:

1. A recording and/or reproducing apparatus comprising:
    a rotating drive mechanism configured to rotate a disk with at least one signal recording surface mounted thereon;
    a transfer mechanism configured to transfer said rotating drive mechanism along a diameter of the mounted disk;
    an optical pickup having at least one objective lens configured to converge a light beam on the recording surface of the disk;
    a detection unit configured to irradiate a light beam onto the disk mounted on said rotating drive mechanism and to detect a tilt of said disk based on a light beam returned from said disk; and
    an adjustment mechanism configured to provide a rotative movement of the optical pickup based on a detection result from said detection unit,
    wherein the rotative movement of the optical pickup is around a center-axis line orthogonal to a plane formed between an optical axis of said objective lens and a rotation axis of said rotating drive mechanism, and
    wherein said apparatus is arranged so that a distance from said center-axis line to said objective lens is shorter than a distance from said center-axis line to a point of contact between said optical pickup and said adjustment mechanism.

2. A recording and/or reproducing apparatus according to claim 1, wherein said adjustment mechanism comprises:
    a cam configured to rotate said optical pickup around said center-axis line; and
    a motor configured to drive said cam based on the detection result from said detection unit.

3. A recording and/or reproducing apparatus according to claim 1, wherein said transfer mechanism comprises:
    a feed guide parallel to a line formed between an optical axis of the light beam irradiated from said objective lens and the center of the disk mounted on said rotating drive mechanism; and
    a transfer operation unit configured to transfer said rotating drive mechanism in a diametric direction of said disk along said parallel feed guide.

4. A recording and/or reproducing apparatus comprising:
    a rotating drive mechanism configured to rotate a disk with at least one signal recording surface mounted thereon;
    an optical pickup having at least one objective lens arranged to converge a light beam on the recording surface of the disk;
    a detection unit configured to irradiate a light beam onto the disk mounted on said rotating drive mechanism and to detect a tilt of the disk mounted on said rotating drive mechanism based on a light beam returned from said disk; and an adjustment mechanism configured to provide a rotative movement of the optical pickup based on a detection result from said detection unit, wherein the rotative movement of the optical pickup is around a center-axis line orthogonal to a plane formed between an optical axis of said objective lens and a rotation axis of said rotating drive mechanism, and wherein said recording and/or reproducing apparatus is arranged so that a distance from said center-axis line to said objective lens is shorter than a distance from said center-axis line to a point of contact between said optical pickup and said adjustment mechanism.

5. A recording and/or reproducing apparatus according to claim 4, wherein said apparatus further comprises:

a transfer mechanism configured to move said rotating drive mechanism and said optical pickup in a relatively diametric direction of the disk mounted on said rotating drive mechanism.

6. A recording and/or reproducing apparatus according to claim 4, wherein said adjustment mechanism comprises:

a cam configured to rotate said optical pickup around said center-axis line; and a motor configured to drive said cam based on the detection result from said detection unit.

7. An optical pickup apparatus comprising:

an optical pickup unit having at least one objective lens to converge a first light beam irradiated from a light source onto a recording surface of a disk with at least one signal recording surface;

a detection unit configured to irradiate a second light beam onto the disk mounted on a rotating drive mechanism and to use a light beam returned from said disk to detect a tilt of the disk where said optical pickup unit irradiates the first light beam; and an adjustment mechanism configured to provide a rotative movement of the optical pickup unit based on a detection result from said detection unit, wherein the rotative movement of the optical pickup unit is around a center-axis line orthogonal to a plane formed between an optical axis of said objective lens and the rotation axis of the disk, wherein said optical pickup unit irradiates the first light beam, and wherein said apparatus is arranged so that a distance from said center-axis line to said objective lens is shorter than a distance from said center-axis line to a point of contact between said optical pickup unit and said adjustment mechanism.

8. An optical pickup apparatus comprising:

an optical pickup having at least one objective lens;

a detection unit configured to detect a tilt of a disk with at least one signal recording surface; and an adjustment mechanism configured to provide a rotative movement of the optical pickup based on a detection result from said detection unit, wherein the rotative movement of the optical pickup is around a center-axis line orthogonal to an optical axis of said at least one objective lens, and wherein said optical pickup apparatus is arranged so that a distance from said center-axis line to said objective lens is shorter than a distance from said center-axis line to a point of contact between said optical pickup and said adjustment mechanism.

9. A recording and/or producing apparatus comprising:

rotating drive means for rotating a disk with at least one signal recording surface mounted thereon;

transfer means for transferring said rotating drive means along a diameter of the mounted disk;

optical pickup means having at least one objective lens for converging a light beam on the recording surface of the disk;

detection means for irradiating a light beam onto the disk mounted on said rotating drive means and detecting a tilt of said disk based on a light beam returned from said disk; and adjustment means for providing a rotative movement of the optical pickup means based on a detection result from said detection means, wherein the rotative movement of the optical pickup means is around the center-axis line orthogonal to a plane formed between an optical axis of said objective lens and a rotation axis of said rotating drive means, and wherein said apparatus is arranged so that a distance from said center-axis line to said objective lens is shorter than a distance from said center-axis line to a point of contact between said optical pickup means and said adjustment means.

10. A recording and/or reproducing apparatus according to claim 9, wherein said adjustment means comprises:

rotating means for rotating said optical pickup means around said center-axis line; and driving means for driving said rotating means based on the detection result from said detection means.

11. A recording and/or reproducing apparatus according to claim 9, wherein said transfer means comprises:

feed guiding means for guiding said rotating drive means, parallel to a line formed between an optical axis of the light beam irradiated from said objective lens and the center of the disk mounted on said rotating drive means; and transfer operation means for transferring said rotating drive means in a diametric direction of said disk along said feed guiding means.

12. An optical pickup apparatus comprising:

optical pickup means having at least one objective lens;

detection means for detecting a tilt of a disk with at least one signal recording surface; and adjustment means for providing a rotative movement of the optical pickup means based on a detection result from said detection means, wherein the rotative movement of the optical pickup means is around a center-axis line orthogonal to an optical axis of said at least one objective lens, and wherein said optical pickup means is arranged so that a distance from said center-axis line to said at least one objective lens is shorter than a distance from said center-axis line to a point of contact between said optical pickup means and said adjustment means.

* * * * *